UNITED STATES PATENT OFFICE.

SOMA GELLÉRI, OF BUDAPEST, AUSTRIA-HUNGARY, ASSIGNOR OF ONE-HALF TO ANTON HAMBLOCH, OF ANDERNACH, GERMANY.

PROCESS OF RECOVERING ALKALIS FROM SILICATE ROCKS.

1,078,495.     Specification of Letters Patent.     Patented Nov. 11, 1913.

No Drawing.     Application filed January 3, 1912. Serial No. 669,278.

*To all whom it may concern:*

Be it known that I, SOMA GELLÉRI, a subject of the King of Hungary, residing at Budapest, Austria-Hungary, have invented new and useful Improvements in Processes of Recovering Alkalis from Silicate Rocks, of which the following is a specification.

A known process for recovering alkalis from silicate rocks consists in treating the silicates with vapor of ammonium carbonate under pressure, whereby the alkalis contained in the silicates are liberated in the form of carbonates. According to the present invention this method of recovering alkalis from silicate rocks by means of vapor of ammonium carbonate may be so applied that the alkalis contained in the silicates are liberated in the form of sulfates. For this purpose, before the treatment with vapor of ammonium carbonate the silicates are heated with lime-stone or an alkaline earth metal oxid and with a sulfate.

Preferably there is used for the purpose alunite.

$$K_2SO_4.Al_2(SO_4)_3 + 2Al_2O_3.6H_2O.$$

The use of this material presents the advantage that the material already contains potassium sulfate itself so that the amount of alkali sulfate obtained by the operation is increased.

The whole reaction which constitutes the basis of the invention proceeds in accordance with the following equation:

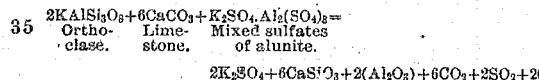
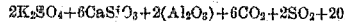

$$2K_2SO_4 + 6CaSiO_3 + 2(Al_2O_3) + 6CO_2 + 2SO_2 + 2O.$$

However, this reaction proceeds completely only seldom, depending on the proportion which the masses of the several compounds bear to each other; thus, on the one hand the complete opening up of the silicates or the liberation of the whole of the alkalis of the silicates occurs only seldom, for there remains a compound of silicates and aluminates of lime and alkali, from which the alkalis can not be separated, and on the other hand a certain excess of lime or sulfate remains, which during the leaching operation passes into solution together with the potassium sulfate. For the purpose of avoiding this objection the silicates, preliminarily heated with lime-stone and a sulfate, are subjected to the action of vapor of ammonium carbonate under pressure which decomposes the calcium potassium silicate, whereby the potassium carbonate which is formed during the opening up with the vapor of ammonium carbonate reacts with the excess of lime and sulfate, or it may be that the ammonium carbonate itself reacts in this manner. By this method the whole of the lime is separated in the form of a silicate or of an aluminate and of a carbonate; so also the silica and alumina which are eventually liberated are separated so that pure potassium sulfate alone passes into solution.

In the process conducted in this manner the whole of the ammonia of the ammonium carbonate is liberated; it is re-converted into ammonium carbonate for the purpose of opening up a fresh batch of silicates. The silicates freed from alkalis and preliminarily burnt with lime and a sulfate which now form a mixture free from sulfuric acid, are burnt by another heating operation to produce Portland cement.

Having thus described my invention and the best means I know of carrying the same into practical effect, I claim:—

1. A process of recovering alkalis from silicate rocks consisting in heating the silicates with lime and a sulfate and in treating the heated mass with vapors of ammonium carbonate under high pressure.

2. A process for recovering alkalis from silicate rocks consisting in heating the silicates with lime-stone and a sulfate and in treating the heated mass with vapors of ammonium carbonate under high pressure.

In testimony that I claim the foregoing as my invention, have signed my name in presence of two subscribing witnesses.

SOMA GELLÉRI.

Witnesses:
    E. H. KELEMEN,
    HUGH KERNENY.